June 14, 1966 W. R. HICKS 3,255,978

TAPE END ATTACHER FOR REELS

Filed March 6, 1963 2 Sheets-Sheet 1

INVENTOR.
Walter Robert Hicks
BY Emery, Whittemore, Sandoe & Graham
ATTORNEYS

TAPE END ATTACHER FOR REELS

Filed March 6, 1963 2 Sheets-Sheet 2

INVENTOR.
Walter Robert Hicks
BY Emery, Whittemore,
Sandoe & Graham
ATTORNEYS 3,255,978

TAPE END ATTACHER FOR REELS

Walter Robert Hicks, Manhasset, N.Y., assignor to Reeves Industries, Inc., Danbury, Conn., a corporation of New York Filed Mar. 6, 1963, Ser. No. 263,242
4 Claims. (Cl. 242—74)

This invention relates to improvements in hub threading constructions for reels that hold sound recording tape, motion picture film, or other long length of strip material. The invention will be described as applied to magnetic tape, but it will be understood that motion picture film and other strip material is a mechanical equivalent of tape for purposes of this invention.

Electro-magnetic recording and reproducing machines now in wide-scale use require a long length of "magnetic tape" to be passed continuously by the record or reproduce heads of the machine, in such a manner that the magnetic material of the tape surface coating may be activated by, or induce a signal in, the record and reproduce heads.

Many such machines depend on very long lengths of extremely thin magnetic tape when equivalently long operational periods are necessary, and it is conventional to roll or spool the long tape length on a central hub or core, usually slightly wider than the width of the tape, with successive convolutions of the tape on the core resulting in a spiral roll of tape with the diameter increasing as the wrapping is continued. In order to maintain an even tape wrapping, and to produce a stable roll which will not fall off the central hub or core, side flanges are usually fastened to the opposite flat faces of the hub. Devices to locate the hub-core-flange assembly on a rotating machine spindle, to key the assembly so that it may be positively driven by some component of the machine, and to allow for fastening or attaching the end of the tape roll to the hub or core are well known. They are of considerable variety, in the present state of the art, and are not a part of this invention.

Hub-core and flange assemblies used for spooling tape are generally referred to as "reels," To lighten the weight of such reels, and also to improve operator access to the core-fastening device when the tape roll end is to be fastened, reel flanges are generally manufactured with openings through the flange walls, in such a manner as to effectively form spokes. When reels with spoked or pierced flanges are rotated at high speeds the spokes tend to act as fan blades, and to agitate air in the same manner as a conventional bladed fan. Some of this air can be forced by the rotating spokes between the layers of tape wrapping on the hub or core, so that after the reel has been completely wrapped and stored for some time, the successively wound tape convolutions change their relative positions, following collapse or escape of this trapped air, affecting machine performance when the reel is re-employed. The whirling spokes also constitute a physical menace, endangering the operator when contacting the fingers of a hand.

It is an object of this invention to eliminate all openings and spokes from the reel flanges; to provide a unique method of securing or attaching the tape roll end to the hub or core without requiring such access holes in the flange walls of the reel, and to provide a tape-roll-securing method which will operate perfectly regardless of the diameter of the reel or the width of the tape. It will also be shown that the same novel fastening method is also easily adapted to standard spoked reels, and is a distinctive improvement on present fastening methods used on the reels now in common use. It will also be evident that the principle of the invention can be readily applied to reels used for winding other long, flat, band material, such as textile ribbons, motion picture film, etc., eliminating the necessity for using reels with flange openings and improving on present hub-tape-securing methods in these fields.

It is a further object of this invention to effect the desired improvement in an extremely simple manner, without the addition of any mechanical parts to the reel or hub assembly, and without requiring any auxiliary tools, fixtures or necessary devices to assist in the securing of the tape roll and to the hub. This securing process is generally known as "threading."

Other objects, features and advantages of the invention will appear or be pointed out as the description proceeds.

In the drawing, forming a part hereof, in which ilke reference characters indicate corresponding parts in all the views.

Figures 1, 2, 3:
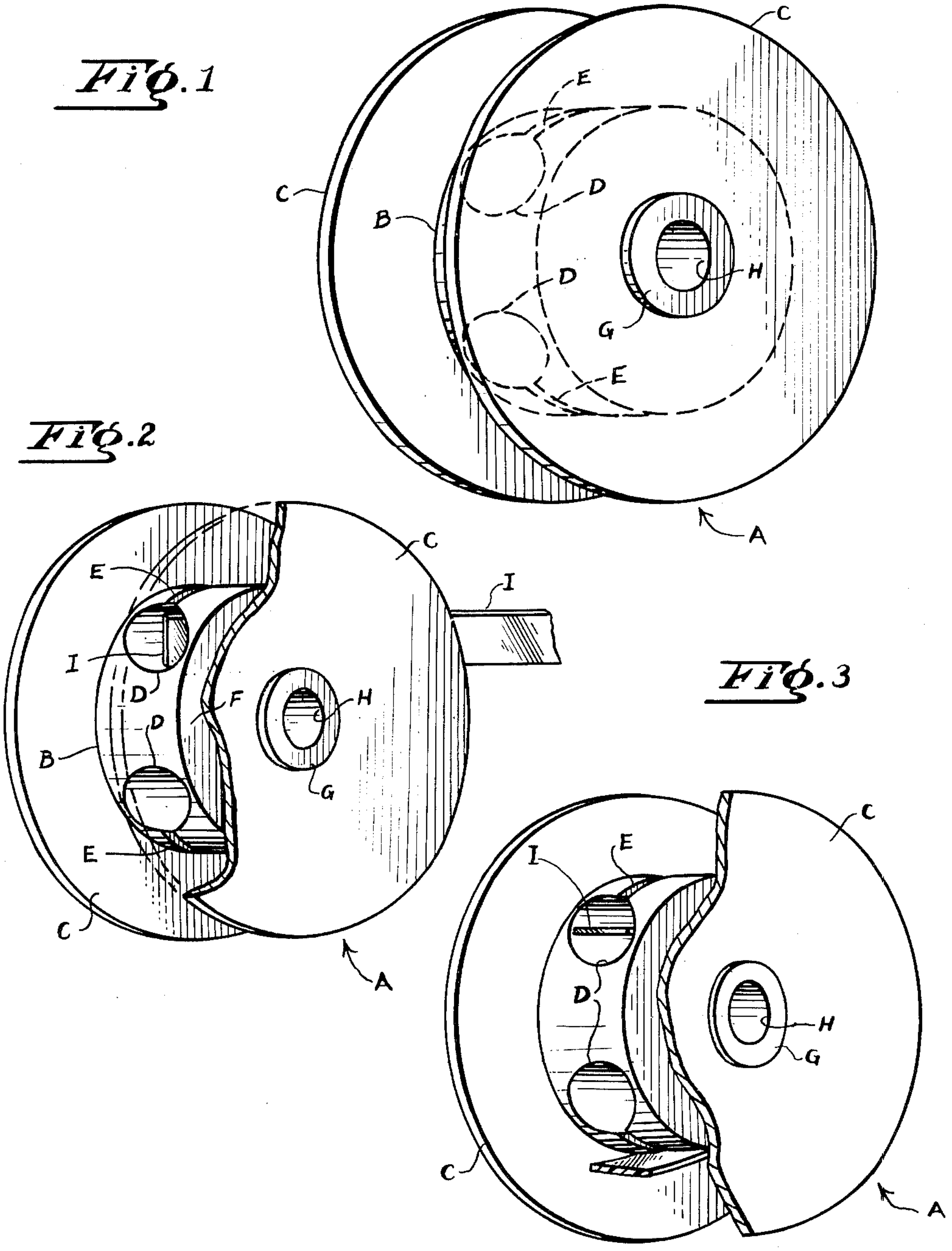
FIGURE 1 is a perspective view of a flanged reel showing the central hub with openings or holes in the hub transverse to the hub axis, and with slots through the peripheral rub face giving access to the holes.
FIGURE 2 is a perspective view of the reel, with one of the flanges broken away, showing the introduction of a vertically-positioned tape length edgewise into a slot and hole.
FIGURE 3 is a perspective view of the reel, similar to FIGURE 2 showing the tape length after insertion through the slot into the hub hole, and after 90° rotation of the tape from its orientation when originally inserted, and after a partial turn around the hub.

In the form of the invention illustrated in the drawing, a reel A includes a central hub B and flanges C. The central hub B has holes D and slots E, each of which extend through the peripheral surface of the hub and communicates with the openings or holes D located immediately below the slot.

Protrusions G on the vertical hub faces F align the axes of the flanges C with the axis of the hub B when the reel is constructed of three separate pieces. The hub and flanges can also be constructed as a single piece, if desired.

Two holes D and slots E are provided in the hub. While only one hole and one slot is used for threading at any particular time, it is important to preserve the balance of the hub to eliminate vibration at high rotational speeds. Balance is preserved by providing one of the holes and slots on the opposite side of the center of rotation from the other and spaced equidistant from the center axis of the hub.

The reel hub B, which preferably has a diameter equal to about one-half the diameter of the flanges C, has a shaft hole H along the horizontal hub axis, to accommodate the axle or shaft of a machine employing the reel as a part of the machine operation. No attempt is made to show keys, slots or other such fasteners peculiar to a specific reel, shaft or machine type, as this is no part of the present invention. It will be understood that the reel shown can be adapted in various ways to suit the preferred reel fastening method.

A length of tape I is inserted into the recess provided by the slot E and hole D on either selected side of the hub. The length of tape I is grasped with the fingers of both hands, as illustrated in FIGURE 4 and the tape is maintained under the same tension to eliminate sagging.

Figures 4, 5, 6:
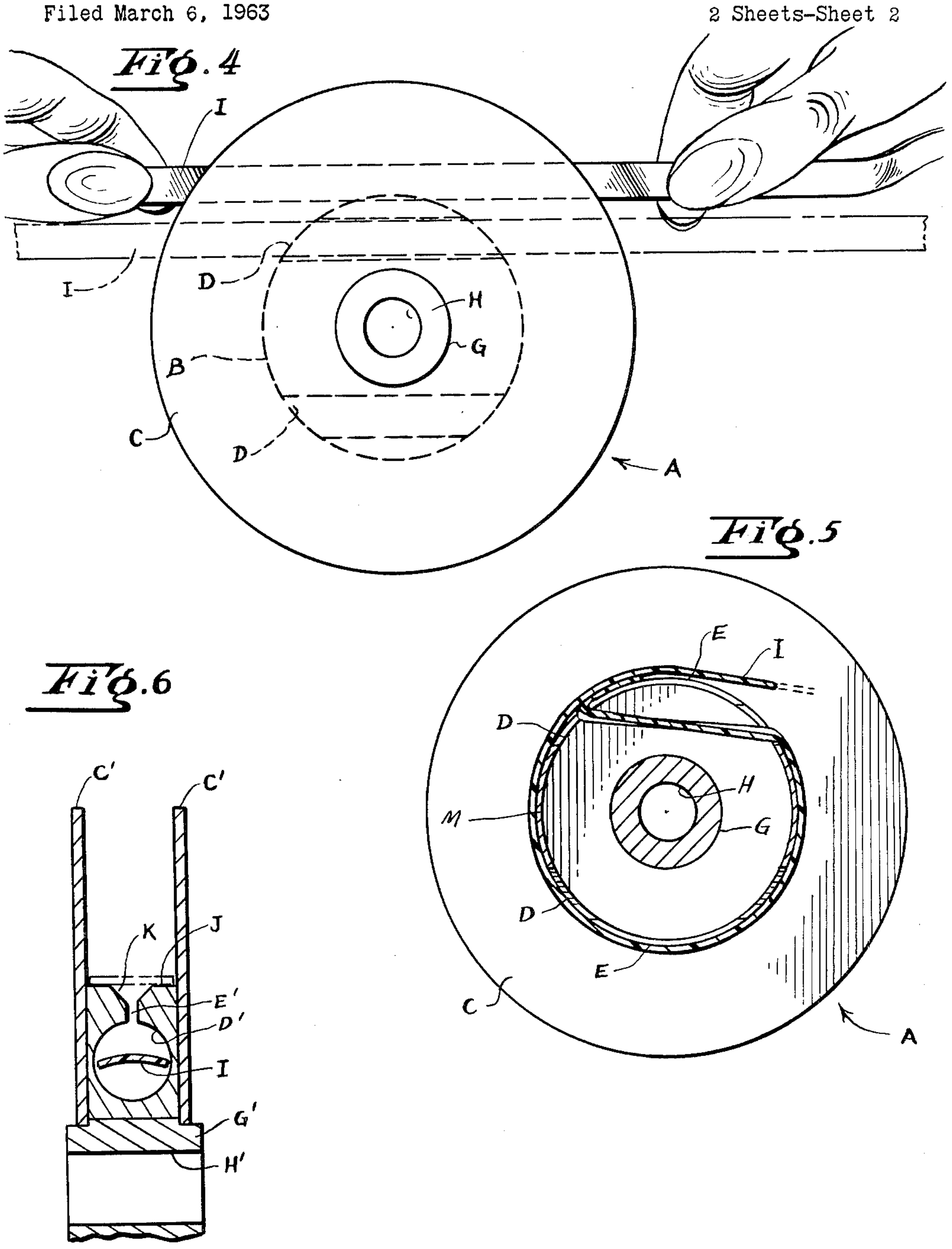
FIGURE 4 is a front view of the reel showing the method of holding a length of tape for initial insertion between the flanges of the reel and then into the recess comprising the slot and hole in the hub.
FIG. 5 is a vertical sectional view through a modified form of the reel and showing one way in which the tape is held after the hub has turned about one revolution following insertion of the tape into the recess in the hub.
FIGURE 6 is a sectional view in the plane of the axis of rotation of the reel and on a larger scale than FIGURE 1, but showing a modified form of the invention.

The tape is turned edgewise to the slot E and the slot is slightly wider than the thickness of the tape so that the tape can be inserted into the slot E and moved radially inwardly to the position indicated by dotted lines in FIGURE 4. The opening D is of sufficient cross-section to permit the tape I to be rotated through an angle of approximately 90° after the tape has moved down into the opening D.

The operator may leave the end of the tape sticking a short distance out of the opening D, and in that case rotation of the reel causes the tape length to wrap around the peripheral face of the hub for one or more circumferential turns, bending the protruding end of the tape as shown in FIGURE 5, and effectively binding the tape end to the hub. Alternatively, the operator may pull the tape until the end is completely within the hole D, as shown in FIGURE 3, and wrapping one or more turns of the tape length around the peripheral face of the hub causes a locking action.

Introduction of the hand-held tape length into the hub slot E is facilitated by providing the peripheral hub face J with a triangular enlargement of the upper end of the slot E′; that is, with a flaring opening at the upper end of the slot. This enlargement serves to guide the tape into the slot E′. Preferably, the maximum width of the triangular enlargement, indicated by the reference character K in FIGURE 6, should not be more than one-half of the tape width so that the tape will be amply supported by the face J and remain flat when wound on the hub.

The opening or hole D′ may be the full width of the tape; but adjustment of the tape length in the hole D′, so as to eliminate a protruding end of the tape after insertion but before wrapping is begun, is aided by having the hole D′ of the diameter slightly smaller than the width of the tape so that the tape is caused to arch, as shown in FIGURE 6. This arching of the tape causes the edges of the tape to press against the sides of the hole D′ and provides a friction to resist pulling of the tape from the hole D′ accidentally while attempting to draw the extending end of the tape into the hole before wrapping the tape on the hub. Other parts of the reel in FIGURE 6 which correspond to the parts in FIGURES 1–5 are indicated by the same reference characters with a prime appended.

The hub, slots and holes have been shown in vertical positions; however, it will be evident that the invention is equally effective when a reel is mounted with its axis vertical, or at any desired angle.

The hub may be solid, except for the holes or openings and the slots; but it is preferably a cylindrical shell having a wall M, as shown in FIGURE 5. With this hollow shell construction, the openings D and the slots E communicate with the open interior of the hub after passing through the wall M of the shell.

The openings or holes D are of circular shape when viewed in the direction of their longitudinal axes; but the actual shape is somewhat different where they pass through the cylindrical surface of the hub B. The longitudinal axis of each of the holes D is in a plane normal to the axis of rotation of the reel.

The openings or holes D need not be circular but it is important that they be wide enough to enable the tape to turn so that where the tape emerges from the opening or hole D though the peripheral face of the hub, the tape will lie flat against the surface of the hub. Otherwise, the next convolution of the tape would be distorted and all subsequent convolutions would have a hump at the location where the original wrap of the tape was pressed out from the surface of the hub by a twist in the tape where it emerges from the opening or hole D. Where the opening is of a diameter or width to cause arching of the tape, as shown in FIGURE 6 the ends of the opening should be wide enough so that the tape can flatten out as it wraps on the surface of the hub.

The preferred embodiment of the invention has been illustrated and described, but changes and modifications can be made, and some features can be used in different combinations without departing from the invention as defined in the claims.

What is claimed is:

1. A tape reel having a center axis, a hub and parallel flanges at opposite ends of the hub and rigidly secured thereto, the spacing of the flanges being substantially equal to the width of the tape with which the reel is intended to be used, the hub having a cylindrical peripheral surface and an opening therethrough of substantially circular cross-section with an axis extending as a chord through the hub and with respect to the cylindrical surface, said opening having a diameter substantially equal to the width of the tape, the cylindrical surface of the hub having a substantial arc of extent between the opposite ends of said opening and having a slot extending for the full length of said arc and extending downward into communication with the top of said opening through the hub, and at a location substantially midway between the flanges, the slot having a width greater than the thickness of the tape so that the tape can be inserted edgewise through said slot into said opening, the opening being of large enough cross-section for the tape to be turned to a position parallel to the center axis of the reel after being inserted into the opening through the slot.

2. The hub described in claim 1 characterized by said hub being hollow and constructed of a cylindrical shell of material, the opening through the hub including two aligned openings through said shell, and the slot extending through the shell along the angular extent of the shell from the top of one of the aligned openings to the top of the other of said aligned openings.

3. The reel described in claim 1 characterized by a tape wound in a spiral on the hub, the tape being of a width slightly less than the spacing of the flanges from one another, the upper portion of the slot being wider axially of the hub than the thickness of the tape, and the lower portion of the slot adjacent to the end of the slot being of substantially the same width as the tape.

4. The reel described in claim 1 characterized by flanges that are imperforate throughout their radial extent beyond the peripheral surface of the hub.

References Cited by the Examiner

UNITED STATES PATENTS

| | | | |
|---|---|---|---|
| 1,429,692 | 9/1922 | Passavanti | 242—74 |
| 2,552,222 | 5/1951 | Schulz et al. | 242—74 |
| 2,969,203 | 1/1961 | Mohrlant | 242—74 |
| 2,974,892 | 3/1961 | Geloso | 242—74 X |
| 3,021,085 | 2/1962 | Freer | 242—74 |
| 3,096,950 | 7/1963 | Gutterman | 242—74 |

FOREIGN PATENTS

| | | |
|---|---|---|
| 728,251 | 11/1942 | Germany. |

MERVIN STEIN, *Primary Examiner.*

N. L. MINTZ, W. S. BURDEN, *Assistant Examiners.*